United States Patent

Moyroud

[15] 3,646,602

[45] Feb. 29, 1972

[54] PHOTOCOMPOSING MACHINE AND KEYBOARD HAVING LINE LENGTH CONVERSION FEATURE

[72] Inventor: Louis M. Moyroud, 202 Grove Way, Delray Beach, Fla. 33444

[22] Filed: Dec. 24, 1968

[21] Appl. No.: 786,632

[30] Foreign Application Priority Data

Dec. 28, 1967 Great Britain ....................58,756/67

[52] U.S. Cl. ....................................................95/4.5 R

[51] Int. Cl.....................................................B41b 17/00

[58] Field of Search..............................................95/4.5

[56] References Cited

UNITED STATES PATENTS

| | | | |
|---|---|---|---|
| 3,273,475 | 9/1966 | Moyroud et al. | 95/4.5 |
| 3,357,327 | 12/1967 | Proud | 95/4.5 |
| 3,422,736 | 1/1969 | Moyroud et al. | 95/4.5 |
| 3,434,402 | 3/1969 | McCall | 95/4.5 |

*Primary Examiner*—John M. Horan
*Attorney*—William D. O'Reilly

[57] ABSTRACT

A photographic-type composing machine utilizing relative units for the representation of character widths, including a keyboard for the control of the machine, in which the selection of various point sizes does not affect the length of line, or the length of a line segment, produced in the photounit. The line length is selected in absolute units (such as picas, inches, or millimeters) at the keyboard, and is then automatically divided by a value representative of the point size selected, the quotient of the division representing the line length in relative units of the point size being used. The quotient is stored in the keyboard for justification purposes, and is also introduced into the controls for the photounit, for example, in the form of punched codes in a paper tape.

4 Claims, 2 Drawing Figures

INVENTOR
LOUIS M. MOYROUD
W. D. O'Reilly
AGENT

INVENTOR
LOUIS M. MOYROUD

W. D. O'Reilly
AGENT

PHOTOCOMPOSING MACHINE AND KEYBOARD HAVING LINE LENGTH CONVERSION FEATURE

BACKGROUND AND BRIEF DESCRIPTION OF THE INVENTION

The present invention relates to a photographic-type composing machine utilizing relative units for the representation of character widths in which a change in the optical magnification ratio of the projection system by selecting various point sizes does not change the length of line which has been preselected in absolute units such as picas, inches or millimeters. This is accomplished by the employment of a tape perforator in the control for the photo unit, including a keyboard for the actuation thereof. While the use of paper tape is preferred, it is apparent that magnetic tape may also be used, if desired, or another form of storage such as a pin register or magnetic cores may be used.

One of the most important advantages of photocomposing machines resides in their ability to produce characters of different sizes from the same matrix character, simply by changing the optical magnification ratio of the projection system. It is now well known that most photocomposing machines utilize characters of different widths, generally measured in relative units. In most systems the relative unit is equal to one-eighteenth of an EM. Every character of a given face has a width measured by an exact number of relative units. Of course the real value of a relative unit (called r.u. in the present description) depends on the point size of the characters produced by the machine. In machines utilizing exclusively the r.u. system of measurement it has been necessary, in the past, to represent the length of line also in relative units. The length of line has to be introduced into the control circuit of the machine in order to accomplish the justification computation, and into the keyboard in order to advise the operator of the approach of the completion of the line, so that the line can be terminated at an interword space or be hyphenated prior to the introduction of an end of line signal. For a given length of line to be produced, measured in absolute units such as points and picas, or inches or millimeters, it is evident that the corresponding length of line in r.u. will vary depending on the size of characters. For example, in 12-point type, a relative unit represents one-eighteenth of a 12-point EM or approximately 0.24 millimeters long will be represented by 200 r.u. The same length of line will be represented by 400 r.u. in six points, because the r.u. of a six-point type is normally 0.12 mm. Thus, one of the inconveniences of the exclusive use of r.u. in a machine capable of producing different type sizes is evident, since each change of point size should be accompanied or preceded by a change of length of line in r.u. in order to produce lines of the same real length or measure regardless of size.

As explained in U.S. Pat. No. 2,876,687, one way to solve the problem is by incorporating a multiplier with the keyboard in order to multiply the basic width of each character, expressed in one r.u. of one point (also called basic machine unit or b.m.u.) by a factor depending on the point size (or set width) of the output character. This system is incorporated in machines commercially known under the name of "Photon 200." In these machines, each keyboard key actuation causes the relative width of the typed character to be multiplied by the point size of the character, and the result of the multiplication is stored in an accumulator which represents, at any moment during the typing of a line, the total accumulated width of the characters of the line in absolute units. This method makes it possible to mix in the same line characters of widely varying sizes without adversely affecting justification.

This method, however, cannot easily be utilized for the control of photocomposing machines in which the character spacing controls operate exclusively in relative units, as is the case, for example, in commercially available machines known as "Photon 713". In this class of machines the spacing of characters on the film is exclusively controlled by the relative width of characters and the "optical leverage" dependent on the optical magnification, as more fully explained in U.S. application Ser. No. 690,720 filed Dec. 13, 1967, now U.S. Pat. No. 3,590,705. In other machines the spacing is controlled by the relative width of characters associated with a system of gears or levers, or optical measuring components.

In all of the photocomposing machines of this "relative unit only" class the mixing of characters of different sizes in the same line must be avoided because it generally requires several complex operations. It is quite customary, however, to mix lines of different sizes but of same length on the same page or column. For example, the production of display advertisements necessitates frequent changes of point size for lines or line segments which are centered or justified on the same measure. The most striking example of frequent point size changes can be found in the classified-display columns of daily newspapers.

Keyboards presently available to drive photocomposing machines based on r.u. systems for character spacing have no provision for the automatic and universal representation of the length of line in r.u. each time the point size is changed. In these keyboards the operator has to look at a chart to readjust the selected length of line for each size change. As this operation may have to be performed as often as once every four lines for "clamped-display" composition it can be appreciated that considerable time is lost at the keyboard. One of the objects of the present invention is a keyboard for the control of photographic type composing machines utilizing relative units for the representation of character widths in which the selection of different sizes does not affect the length of line produced in the photounit.

Another object of the invention is a keyboard for the composition of lines of characters of different widths in which the length of line is selected in absolute width units and in which the character widths are accumulated in relative units.

The foregoing objects are achieved by selecting the length of line in absolute units (picas, inches or millimeters) at the keyboard and automatically dividing this length of line by a value representative of the point size selected, the quotient of the division representing the length of line in relative units of the size being used, said length of line in r.u. being stored in the keyboard for counting purposes (to advise the operator on the completion of a line) and being further transferred to the photo unit controls, for example in the form of punched codes in a paper tape.

The present invention will be more fully described in the detailed description which follows, in which:

FIG. 1 is a schematic representation of the preferred embodiment of the invention; and FIG. 2 is a modification of one portion of the preferred embodiment.

DETAILED DESCRIPTION OF THE INVENTION

Figure 1:
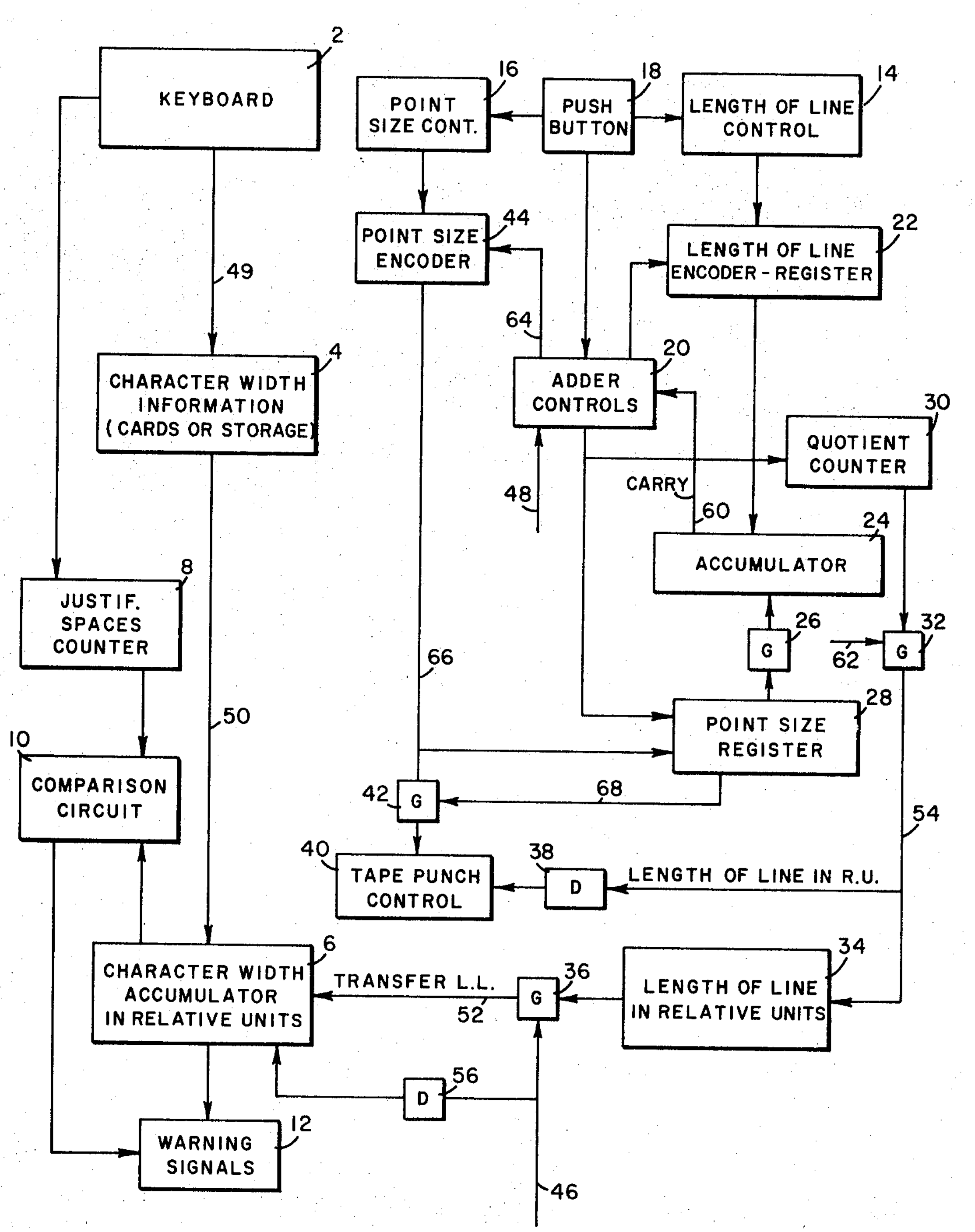

Referring to FIG. 1 of the drawings, the keyboard, shown at 2, may have individual contacts to represent each character, or may be associated with a decoder circuit. The wires 49 representing each character, in coded form or not, are directed from the keyboard to a width selection unit 4 which may include style cards as described in U.S. Pat. No. 3,332,617. The wires 50 emerging from block 4 represent character widths in r.u.. These widths are stored in a width accumulator 6. The width accumulator can be preset at a value determined by the length of line desired, expressed in r.u.. For example, as described in U.S. Pat. No. 2,682,814 the accumulator can be preset at a value representing its total capacity minus the length of line desired. In this case the accumulator will reach full capacity when the length of line composed reaches the predetermined measure, as each character width is added as typing proceeds. Of course, the typing of a line is terminated before the accumulator reaches full capacity. The operator can be advised of the approaching limit by different warnings. In a preferred arrangement the operator is first advised of entering the justification zone by a light or bell. This signal 12 is generated by comparing, in a comparison circuit 10 the number of justifying spaces times their maximum expansion represented in block 8, to the line deficit. As the operator continues typing and new character widths are entered into accumulator 6 another signal is generated, for example, a buzzer is energized, as soon as the line deficit has been reduced to five average character widths (45 r.u.) At this point the operator has to decide on how to terminate the line. Similar circuits are incorporated in the well-known "Photon-200" machines.

In the example of the figure, the binary accumulator 6 is first preset at the length of line value in r.u. and then automatically inverted so that it will reach full capacity when the next line is completely full as explained above.

The length of line controls of the keyboard are represented by block 14. These controls may include following series of pushbuttons or rotary switches. If rotary switches are utilized, a series of three switches could be used to represent 10 picas, one pica and one point respectively. Rotary switches or pushbuttons could also represent lengths of lines in other units of measurement such as millimeters or inches. In order to simplify the circuitry it is also possible to utilize switches representing the length of line in binary form. For a machine based, for absolute measurements of a basic machine unit of 0.02 mm. (approximately one unit of one point) pushbuttons could have the efollowing values, in millimeters; 0.02; 0.04; 0.08; 0.16; 0.32; 0.64, etc. In order to find out which buttons to operate the operator has to look at a conversion chart. In a preferred embodiment "pica" rotary switches are used together with encoding circuitry 22 for the purpose of representing the "absolute" length of line in binary form.

Another purpose of block 22 is to represent, in binary form, the reverse of the selected length of line so that, in subsequent computation, the value representing the length of line can be divided by the point size by performing a series of additions. This length of line can be represented by 14 binary stages for machines capable of producing 8-inch lines (200 millimeters). The basic machine unit (b.m.u.) in the present example has been chosen to be 0.02 mm. which is close enough to one-eighteenth of a point as stated above. The reverse or complement of the length of line, in binary form is transferred to the accumulator 24 in which the first binary stage has a value of 0.02 mm., the second 0.04 mm. and the fourteenth 163.84 mm.

The point size selection is represented by block 16. This block may include eight buttons for a machine capable of producing eight different sizes, each one corresponding to a different magnification of the matrix characters. Each button may have, for example, the following values, representing corresponding point sizes = 6, 8, 10, 12, 14, 18, 24 and 30. The value represented by a depressed button is transformed in binary representation by a point size encoder 44 and transferred to point size register 28. After the operator has selected the length of line and/or the point size he presses pushbutton 18 to energize the control circuit of box 20. One of the purposes of this circuit is to divide the value of box 24 by the value of box 28. This can be achieved, as is well known in the art by adding repetitively the value of box 28 (point size) to the value of accumulator 24 until the capacity of said accumulator is exceeded, which is detected by the appearance of a "carry" pulse on wire 60. The number of times the point size value has been added to the length of line value is stored in box 30 which, in a circuit operating as just described, represents the quotient plus 1.

For the purpose of this description it is assumed that quotient plus 1 is a sufficient approximation and that the remainder of the division can be dropped. For all practical purposes this is quite acceptable. It is, however, evident that more complex circuitry could be used to produce the quotient and the remainder. In such circuits it is also possible to store in box 30 the quotient if the remainder is less than 50 percent of the value of box 28, and the quotient plus 1 if it is larger.

Block 26 represents a gate controlled by circuit 20 for the purpose of computation. Pulses are channelled to circuit 20 by a wire 48. When a carry pulse appears on wire 60 the succession of additions terminates as the division is now complete and the control circuit 20, through wire 62 opens gate 32 to transfer the quotient stored in box 30 to punch control 40 through wire 54 and a delay 38. The quotient represents the length of line in r.u.. This value is also transferred to register 34 where it is stored until a new length of line or a new size are selected by the operator. At the end of its operation the control circuit 20 through wire 46 opens gate 36 to transfer the length of line in r.u. to the width accumulator via wire 52 and, after a delay at 56, the width accumulator is reversed (binaries "1" become "0" and vice versa) so that the relative length of line will be represented by the difference between the full capacity of the accumulator 6 and the value just entered. In this way, as each character is typed its width is added to the accumulator, full line length being obtained when the accumulator is completely full (all binary stages in position "1").

It has been assumed that said accumulator 6 has been reset to zero prior to the entry of a new length of line or point size. Actually the accumulator 6 is automatically reset to zero by the actuation of the carriage return key, which also causes a pulse to appear on wire 46 in order to transfer the value of register 34 into the accumulator and to reverse this value.

Figure 2:
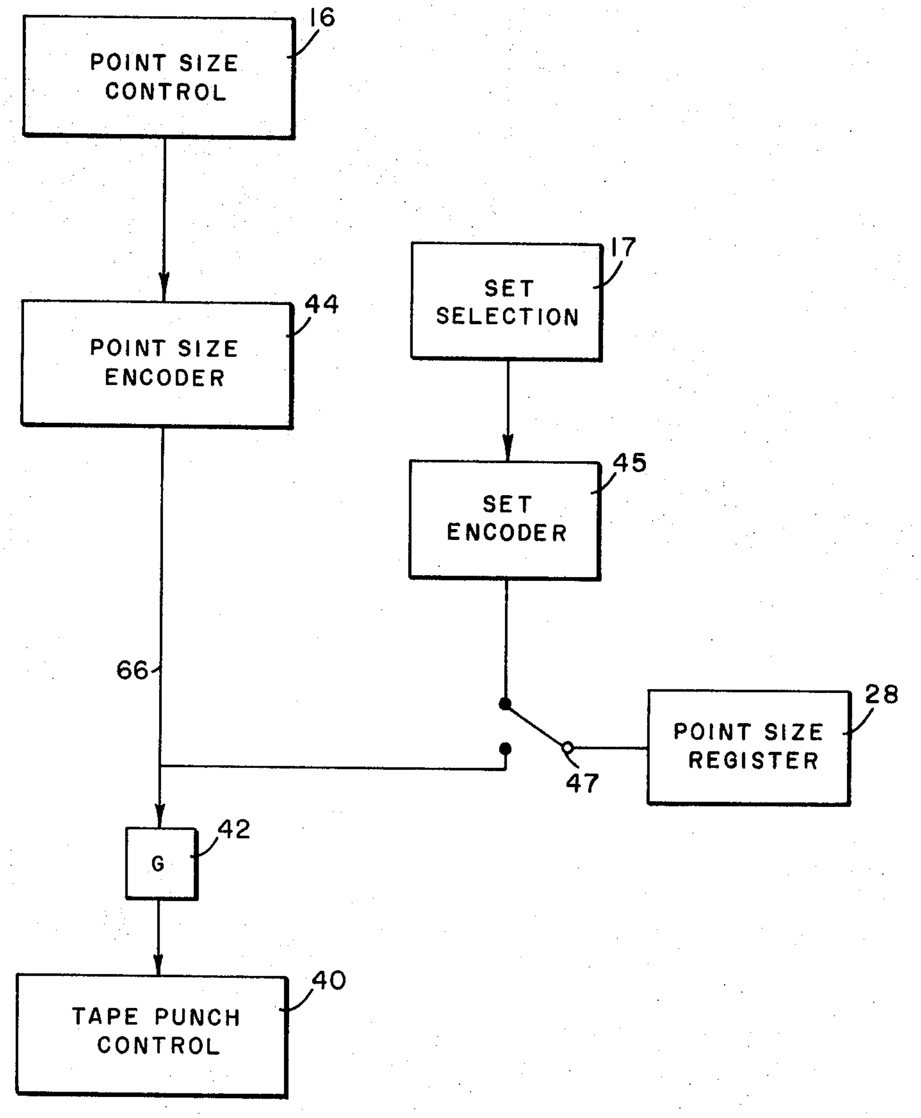

If it is desired to condense a given typeface without actually changing the style cards in box 4, the schematic representation depicted in FIG. 2 of the drawings may be employed. As explained previously, the point size is selected at box 16 and encoded in box 44 prior to transferal via gate 32 to tape punch control 40. However, transfer contact 47 is positioned by a manual control button (not shown) so as to interrupt the transmission of the encoded point size to register 28. Instead, the condensed value desired is selected at box 17 and encoded in box 45, prior to being transmitted to register 28 via transfer contact 47. From this pint the circuit functions precisely as previously described with respect to FIG. 1. Thus, if 12-point type size is chosen, but a 10-point typeset width is desired (i.e., a condensed typeface), the latter value is selected at box 17 (with transfer contact 47 properly positioned), encoded and transferred to box 28. Since the width of each character in a condensed typeface is less than the corresponding character in a normal typeface or style, the number of the characters in a line under composition will increase proportionately while of course the absolute line length remains unchanged.

Examples will now be described to further explain the operation of the keyboard. It will be assumed that the text is to be composed in nine point, in lines 25 picas long (or 105 mm.).

The operator selects the size by pushing the nine-point button (one of a series of eight interlocking buttons) and the length of line by positioning the 10s pica dial on 2, the unit pica dial on 5 and the point dial on 0.

As soon as the operator selects the length of line, its transformation into binary form is performed by block 22, which represents the reverse or complement of the desired length of line in binary form. Block 22 may be a conventional diode matrix, or relays may be used to accomplish the transformation.

The selection of size and length of line having been made, the operator now presses pushbutton 18 to energize control circuit 20 and initiate a sequence of operations. Control 20 causes first the content of register 22 to be transferred to accumulator 24. This accumulator has 14 binary stages numbered 1 to 14 having the following values in millimeters: 0.02; 0.04; 0.08; 0.16; 0.32; 0.64; 1.28; 2.56; 5.12; 10.24; 20.48; 40.96; 81.92 and 163.84. Its total capacity (all 14 stages "on") is 327.65 mm. The selected length of line is represented in the accumulator by stages 2. (0.04mm.) plus 8 (2.56 mm.) plus 11 (20.48 mm.) plus 13 (81.92 mm.) in the "0" position so that the accumulator will reach full capacity (all stages in the"1"position) after a value equal to the length of line has been added. The point size encoder control circuit 44 now causes (through wire 64) the coded value of the point size to be transferred via wire 66 and gate 42 to the punch control circuit 40 and also to the point size register 28. The next operation controlled by circuit 20 is the computation of the quotient obtained by successive additions of the content or register 28 to the accumulator 24 as stated above. In the present example, the deficit of accumulator 24 is represented by stages 2, 8, 11 and 13 or 2 plus 128 plus 1,024 plus 4,096 units or 5,250 units. The point size is 9. Consequently, for the accumulator to present a carry (at the highest stage) it will be necessary to enter 584 times the point size, thus the quotient is 584 representing the length of line in r.u. for nine-point type. The result can be checked as follows: one r.u. in nine points is 0.02×9=0.18 mm. Consequently, 584 units represent 584 times 0.18 or 105.12 mm. As explained above the fractional relative unit (0.12 mm. in this case) can be considered as insignificant If the point size only is changed by the operator the energization of button 18 causes the same sequence of operations as above in order to compute the new length of line in r.u.

It will be apparent to those skilled in the art that different circuits can be used without departing from the scope of the present invention. It is possible for example to activate the control circuit 20 directly from the length of line selection buttons 14 or from the point size controls 16. In other words, each time a new point size is selected this selection can activate the control circuit and cause the computation of the length of line. In this case the pushbutton 18 is not necessary. It is also possible to avoid punching the point size code into the tape whenever the length of line only is changed. This can be achieved by opening gate 42 via wire 68 only in the case where the value of point size register 28 is changed.

As the lowest stages of accumulator 24 are representing very small units this accumulator could, if desired, be simplified by removing the two or three less significant stages. It is apparent that the circuit represented in the drawing boxes can be combined and that the other computation and storage systems can be utilized.

The foregoing description is intended to be illustrative only. Various changes or modifications in the disclosed embodiments may occur to those skilled in the art. It is understood, therefore, that all such modifications which would be apparent to one skilled in the art are included within the scope of the present invention.

What is claimed is:

1. In a photographic type composing machine which utilizes relative units for the representation of character widths, including a keyoard for the control of said machine, said keyboard having character width selection means and character width accumulator means associated therewith:

point size control means for selecting any one of a plurality of point sizes, point size encoder means for representing a selected point size in coded form, means for storing said encoded selected point size, line length control means for selecting a predetermined length of line in absolute units, line length encoder means for representing said predetermined absolute line length in coded form, accumulator means for storing said encoded absolute line length, and control means for automatically dividing said encoded, stored absolute line length by said encoded, stored point size, said divider control means including a quotient storage for receiving the quotient of said divider control means, said quotient representing the length of line in relative units of the point size selected, such that a change in point size from one line of composition to the next does not require a corresponding change in said predetermined absolute line length said quotient storage having associated therewith means for introducing said quotient into a control means for the photounit of the machine in order to accomplish the justification computation.

2. The machine of claim 1 in which said means for introducing said quotient into the control for the photounit comprises a code on a tape.

3. The machine of claim 2 wherein said quotient introduction means includes means for punching said code on a paper tape.

4. The machine of claim 1 including means for storing said quotient in the keyboard for counting purposes, in order to signal the approach of the completion of a line of composition.

* * * * *